UNITED STATES PATENT OFFICE.

JOHN H. KELLOGG, OF BATTLE CREEK, MICHIGAN.

VEGETABLE-FOOD COMPOUND.

SPECIFICATION forming part of Letters Patent No. 670,283, dated March 19, 1901.

Application filed June 3, 1899. Renewed August 18, 1900. Serial No. 27,347. (No specimens.)

*To all whom it may concern:*

Be it known that I, JOHN HARVEY KELLOGG, a citizen of the United States, residing at Battle Creek, in the county of Calhoun and State of Michigan, have invented a certain new and useful Improvement in Vegetable-Food Compounds; and I do declare the following to be a full, clear, and exact description of the invention, such as will enable others skilled in the art to which it appertains to make and use the same.

My invention relates to an improvement in vegetable-food compounds; and it consists in combining gluten of wheat or other cereals and water with a meal prepared from peanuts or other oleaginous nuts, as will be more fully described hereinafter.

The object of my invention is to furnish a vegetable substitute for meat which shall possess equal or greater nutritive value in equal or more available form for digestion and assimilation and which shall contain the essential nutritive elements in approximately the same proportion as beef and mutton and which substitute has a similar flavor and is as easily digestible as the most tender meat.

In my preferred process for producing this vegetable substitute for meat I take gluten from some cereal — preferably wheat — and wash it in the usual manner until practically free from starch. It is then mixed with meal, which has been produced from peanuts or other oleaginous nuts, in the proportion of one part dry nut-meal to one, two, or three, or larger proportion of the raw moist gluten of wheat. The mixture is preferably effected as follows: The gluten and meal are passed one or more times through a vegetable shredding or other suitable mixing machine, whereby the meal and gluten are intimately combined. They are then carefully mixed with the proper quantity of water, the amount varying according to the exact flavor and consistency desired in the product to be produced. The mixed preparation is then subjected to cooking for a period of one to three hours or more and at a temperature varying from the boiling-point to about 230°. The effect of the cooking is not only to preserve the product in the way in which the ordinary canned foods are preserved, but in connection with the other steps of the process described to modify its consistence and flavor, both of which are changed in a very remarkable way and to a very marked extent, and to develop dietetic and gustatory properties in the mixture not possessed by either the gluten or the nut-meal. By proper regulation of the temperature and proportions of the ingredients various meat-like flavors are developed, which give to the finished product very characteristic properties. The peculiar flavor developed depends upon the exact proportions of the ingredients, the temperature employed, the mode of mixing, and the length of time for which the product is exposed to the particular temperature.

My food product is purely vegetable in character. It contains no animal substance or extract. In color and appearance it resembles potted veal or chicken. It has a distinctly meaty odor and flavor. When a bit is torn off and chewed, it shows a distinct fiber. It is of such consistency that it may be masticated like tender meat and when cooked retains its form as does meat. As is the case with animal flesh, its color varies somewhat, according to the temperature to which it is subjected in cooking, the higher the temperature the darker the color. At a temperature near the boiling-point of water its color is the same as that of boiled meat. It may be cut in slices and served cold. It may be broiled like meats of all sorts and lends itself to the various culinary manipulations in a manner altogether resembling meat. Laboratory digestion experiments demonstrate that it is digestible in less time than meat-pulp. This is due to the well-known fact that the digestibility of vegetable proteids is increased by cooking, while animal proteids are rendered less digestible by cooking. Broths and soups somewhat similar to those prepared from flesh may be prepared from my compound, which may be justly claimed to serve as a perfect physiological substitute for flesh foods.

Among the advantages which may be claimed for my vegetable-food-compound preparation the following may be mentioned: It is more digestible than flesh meats. It is free from danger of contamination with the disease germs or putrefaction products, and hence may be freely employed in many disorders in which physicians find it wise to prohibit the use of flesh foods, such as rheumatism, gout, Bright's disease, various disorders of the liver, myxoedema, and exophthalmic goiter. It is an economical substitute for flesh food, as it can be commercially produced at a price less than that usually charged for flesh meats. Its use obviates the necessity of slaughtering animals, against which in certain countries, as India, there are many millions of people who entertain a deeply-rooted prejudice. It may be freely used without incurring many of the risks which are involved in the free use of flesh meats.

Having thus described my invention, what I claim is—

1. A food product composed of gluten, water and the meal of edible oleaginous nuts, mixed together and cooked, as set forth.

2. A food product composed of the gluten of wheat, water and the meal of edible oleaginous nuts, mixed together and cooked, substantially as set forth.

3. A food product composed of the gluten of wheat, water and peanut-meal, mixed together and cooked, substantially as set forth.

JOHN H. KELLOGG.

Witnesses:
MAMIE LEONARD,
MARY E. WALSH.